(12) United States Patent
Skoog

(10) Patent No.: US 7,082,350 B2
(45) Date of Patent: Jul. 25, 2006

(54) ROBOT SYSTEM

(75) Inventor: Hans Skoog, Västerås (SE)

(73) Assignee: ABB AB, Västerås (SE)

( * ) Notice: Subject to any disclaimer, the term of this patent is extended or adjusted under 35 U.S.C. 154(b) by 143 days.

(21) Appl. No.: 10/433,400

(22) PCT Filed: Dec. 4, 2001

(86) PCT No.: PCT/SE01/02676

§ 371 (c)(1),
(2), (4) Date: Jun. 3, 2003

(87) PCT Pub. No.: WO02/45914

PCT Pub. Date: Jun. 13, 2002

(65) Prior Publication Data

US 2004/0015266 A1     Jan. 22, 2004

(30) Foreign Application Priority Data

Dec. 4, 2000    (SE) .................................... 0004466

(51) Int. Cl.
*G06F 19/00*    (2006.01)
(52) U.S. Cl. ............... 700/245; 700/246; 180/171; 180/282; 180/285; 180/441
(58) Field of Classification Search ........ 700/245–246; 180/171, 271, 282, 285, 441
See application file for complete search history.

(56) References Cited

U.S. PATENT DOCUMENTS

| | | | |
|---|---|---|---|
| 3,753,574 A * | 8/1973 | Werle ....................... 280/479.2 |
| 4,698,775 A | 10/1987 | Koch et al. |
| 4,887,013 A | 12/1989 | Doth |
| 4,954,962 A * | 9/1990 | Evans et al. ................... 701/28 |
| 5,324,948 A | 6/1994 | Dudar et al. |
| 5,525,882 A * | 6/1996 | Asaka et al. ........... 318/568.16 |
| 5,559,696 A | 9/1996 | Borenstein |
| 5,787,545 A * | 8/1998 | Colens ......................... 15/319 |
| 6,430,471 B1 * | 8/2002 | Kintou et al. ................ 700/245 |
| 6,453,212 B1 * | 9/2002 | Asama et al. ............... 700/245 |
| 6,651,763 B1 * | 11/2003 | Kamen et al. .............. 180/171 |

FOREIGN PATENT DOCUMENTS

WO    01/38945    5/2001

OTHER PUBLICATIONS

Hougen et al. Rabid Unsurpervised Connectionist Learning for Backing a Robot with Two Traillers, 1997, IEEE, pp. 2950-2955.*

(Continued)

*Primary Examiner*—Thomas G. Black
*Assistant Examiner*—McDieunel Marc
(74) *Attorney, Agent, or Firm*—Venable LLP; Eric J. Franklin

(57) ABSTRACT

An autonomous wheeled mobile robot (1) comprising at least one wheel-driving motor, an on-board computer, means for navigation, orientation, and maneuvering in an environment with moving obstacles; a sensor system; and a wireless communication system for receiving and sending.

24 Claims, 4 Drawing Sheets

OTHER PUBLICATIONS

Hanebeck et al., A modular wheel system for mobile robot applicaitons, 1999, IEEE, p. 17-22.*

Nukulwuthiopas et al., Dynamic modeling of a one-wheel robot by using kane's method., 2000, IEEE, p. 524-529.*

* cited by examiner

ROBOT SYSTEM

TECHNICAL FIELD

The present invention relates to a robot system comprising a wheeled automatic robot and more particularly to a system including an autonomous robot having onboard data processing, sensor, guidance and communication means. More specifically, such a system comprises an autonomous robot, which per se, is suitable for use in such a system. The invention also relates to a method performing operations with the aid of an autonomous robot, a computer software product to carry out the method as well as a particular use of such a robot system. A robot in this context should mean a mobile robot and more precisely a wheeled mobile robot. The expression autonomous robot hereinafter means a robot that is self-governed such that the robot, on a given order, manages itself to find its way to a target location and carry out an ordered operation.

BACKGROUND OF THE INVENTION

Mobile robots have been known for quite some time both in the realm of science fiction and now in the real world. A first category of such robots are manually controlled. From a stationary location separated from the robot, it is controlled by wire or by wireless communication to carry out operations which are sometimes dangerous to man. A second category of these robots are automatically controlled. In a first aspect, these robots are arranged to automatically follow a track, which sometimes is invisible. Such a robot carries means for steering along a predefined track. In a second more sophisticated aspect of these mobile robots, they are equipped with an onboard computer by which they perform tasks of their own by a preprogrammed calculation.

Among the automatic robots there are specially two kinds: the track-finding robot and the border-finding robot, or combinations of the two. The track-finding robot carries means for finding a track, which in most cases is a buried wire that radiates a magnetic field. In yet another embodiment of this system, the track-finding means comprises a navigation system from which the robot finds out the predetermined track. The border-finding robot is typically an automatic lawn mower or an automatic vacuum cleaner. These robots sometimes carry a semi-autonomous system to find its paths and the location for battery recharging. They normally carry an onboard computer that is programmed to organize the planning of paths for efficient lawn mowing or vacuum cleaning. Thus, the only self-governing decisions to make is turning aside when an obstacle projects in front or if the robot has reached the border of the operation area. These robots are designed to perform one dedicated operation only and cannot be used for other operations. Although these robots are very costly to produce, they stay inactive most of the time. Thus, there is a need for a self-governed robot that performs a plurality of operations.

Automated guided vehicles (AGV), such as an automatic forklift, are commonly used for picking up and delivering goods or parts in a locality such as a warehouse or a factory. These vehicles are usually guided by floor loops or tracks. Vehicles of this kind are specially made for specific retrieving transporting and depositing tasks. A system including a plurality of such automated guided vehicles is often expensive. It has limited utility and is only feasible when a task is to be performed a huge number of times. It is, however, advantageous where manual performance is less reliable, extremely expensive or hazardous to humans. Due to the expense and difficulty of installing such system, as well as safety and obstacle considerations, they have not found much widespread use outside the manufacturing industry.

In other areas, wheeled service robots have been afforded greater interest in recent years. One example is a camera and sensor equipped robot designed for security patrols. Others are designed to defuse explosives while still another is designed to be a tour guide. Robots of this kind are designed to be mail and goods couriers, hotel servants and also garbage collectors. Other robots are specially designed to perform tasks in dangerous radioactive environments. Each of these known robots is made for a specific operations or a limited number of closely related operations. Attempts has been made to combine a plurality of operation possibilities to one robot only. Such a robot must then at all times carry around equipment for performing different operations yet only one piece of equipment is used at a time. This leads to heavy and clumsy robots that demand much power.

Through U.S. Pat. No. 5,324,948 an apparatus for performing radiological surveys is previously known. The object of the apparatus, which is an autonomous robot, is to eliminate the survey being performed by manual scanning. Thus, an autonomous robot is provided, which is directed by wireless transmission from a stationary host computer to perform a survey along a predefined path. On an operation command of going "from point a to point b", the program in the host computer sorts through its database of action files to find a path between the points. The host computer then downloads the most efficient path to the robot, which has an onboard computer. Once a path is downloaded, the robot acts autonomously until it reaches the end of the path. Typically the environment where the robot operated is made up of well-defined, unobstructed smooth surfaces.

The actual path planning is done by a host computer, not by the robot. To program the robot the operator first defines valid points in the area where the robot is to operate. Then the robot automatically finds its way along the path with the help of sensors mounted on the robot. Since the actions of the robot always are preprogrammed, the robot can not be regarded as being autonomous but merely automatic. There is no instances where the robot make its own choice on where to go. All of its actions are programmed in advance.

The known robot is dedicated for one operation only. When not in use the robot is resting at a docking station where it is recharged. Thus an enormous amount of money is spent on a product which most of the time is resting and not given credit for. The performance is also very poor. The normal speed of the robot is about 9 meters per hour.

Wheeled robots are normally designed for transport on flat and smooth surfaces. In an open environment, such as outdoors, the topography is instead rough and contains slopes as well as hills. To perform well in such environments, the robot must have big wheels and a low center of gravity. Even then the rough surface may constitute a problem when the robot has more than three wheels. Then one or a plurality of the wheels will be lifted from the ground when the robot is travelling. This leads to other problems, like getting stuck or not being able to keep track of navigation. The normal approach to solve this problem is to lower the center of gravity, restrict the number of wheels to three and to spread the wheels out from the center of gravity. Even then there are situations when such a robot can not master the situation without falling.

In an environment where the situation in which the robot must perform has moving people and objects in it, such as hospitals or the home, the robot must be able to make quick decisions to avoid collision with moving or temporary objects blocking its way. Not only must such a robot learn to navigate in a new environment, but must also quickly adapt to changes in the environment. These robot must also have special safety and avoidance mechanisms. An autonomous wheeled robot of this kind is previously known and designed to perform material transport operations in a hospital environment. In response to keyed-in commands, it transports pharmaceuticals, lab specimens, supplies, meals, medical records and radiology films. It has specific built-in compartments and trays for these tasks. This operation-dedicated robot has built-in sensors and a collision avoidance system to be able to perform in an environment with moving people and objects.

Providing a robot for general purposes having all of the above mentioned features will be very expensive due to development and maintenance costs for hardware and software. There are few individual applications outside of the manufacturing industry where these costs will not make the robot very expensive or will employ a robot which is used only occasionally. There are a great number of short duration tasks in the home, hospitals, laboratories and offices etc. where it would be desirable to have a robot, but where a separate operation-dedicated robot for each task would be unfeasible.

SUMMARY OF THE INVENTION

The object of the present invention is to find ways to develop a robot system of the kind discussed above and eliminate or at least reduce one or a plurality of the drawbacks mentioned by way of introduction, whereby particularly a greater flexibility of a robot system is aimed at.

According to a first aspect of the invention this object is achieved by a mobile robot system comprising an autonomous mobile robot and a plurality of mobile operation modules. The autonomous robot carries an on-board computer and comprises means for navigation, environmental sensing and communication. An operation module is typically designed to perform one or a plurality of related predetermined operations, such as lifting, transporting, vacuum cleaning etceteras. The system is designed to combine the autonomous robot and an operation module to a movable unit where the robot navigates the unit and the operation module performs the desired operation at a predetermined location. In this constellation, the robot has the intelligence and the operating module has the power. The same intelligent robot is thus used to control each of the operation modules. When a first operation is completed the mobile unit returns to a docking station where the robot parks the first operation module and then docks with a second operation module to form a second operation unit. On an order from a central command unit the new operation unit makes its way to a second location to perform a second operation.

According to a second aspect of the invention the object is achieved by an autonomous robot that has two wheels only. These wheels are aligned in parallel and have separate tracks. Depending on the center of gravity being located below or above the wheel axle there are two kinds of stabilizing systems. When the center of gravity is below the axle a passive stabilizing system is developed comprising a drive system for controlling the acceleration, driving and retardation of the robot. When the center of gravity is located above the wheel axle an active stabilizing system must be used. This means that even when the robot is standing still the active stabilizing system must by information from an pendulum and by rocking the wheel back and forth keep the robot in an upright position. In this embodiment of the invention the stabilizing system comprises a driving system that is superposing the stabilizing system. When, for example, the robot are to make a forward move the driving system cause the wheels to rock backwards, by which the robot will be leaning forwardly an start falling. In a second moment the driving system will accelerate the wheels in a forward direction, by which a force is created that counteracts the falling force. In one embodiment the robot comprises supporting feet which are felled down when the robot is inactive. If the center of gravity coincides with the wheel axle no control of the robot can be achieved. There must always be a distance between the center of gravity and the center of the driving axle. Such a lever function causes a torque that counteracts the driving torque.

According to the invention, these objects are achieved by a robot according to the features in the characterizing part of the independent claim 1, a robot system according to the features in the characterizing part of the independent claim 12, as well as by a method according to the features in the characterizing part of independent claim 17. Preferred embodiments are given by the features of the characterizing parts of the dependant claims.

The mobile robot system has a plurality of different interchangeable operation modules which are selectively and autonomously dockable to the autonomous mobile robot. Such a system of a single autonomous mobile robot and a plurality of operation modules makes it economically feasible to develop robot applications to fulfil a plurality of operations. The many different specialized robots (e.g. for floor polishing, vacuum cleaning, storing and retrieving, surveillance, lifting and general transport) all have certain functions in common, for example the wheels, suspension and drive motor, the sensor and navigation and guidance system, the on-board transceiver interface for user and computer interaction as well as the computer power to support these functions. These functions in common are included in the single autonomous mobile robot which could then couple itself as required to one of any number of task-dedicated operation modules. It is thus economically feasible to make a major investment in the design and development of such a robot system. This would be equipped with the latest state-of-the-art navigational, speech recognition, communication and decision-making hardware and software, since the same autonomous mobile robot could then be used for a plurality of different applications.

The autonomous mobile robot comprises an on-board computer, a plurality of sensors, a signaling interface a mechanical coupling interface and communication means. The computer comprises a processor, memory means and a plurality of computer programs for controlling the robot. In the memory are stored digital maps of the present environment, navigation beacons and information of each and every operation module. The memory also carries ready to use strategies for navigation, orientation, maneuvering, communication as well as strategy for avoiding collisions. All information and programs are supplied by a network, such as a wireless local area network (LAN) or the Internet. The sensors comprises distance measuring means, such as an ultrasonic radar, sound measuring means, such as a microphone, and visual measurement system, such as a vision system including optics and an image sensor like an electronic device that is capable of transforming a light pattern (image) into an electric charge pattern, such as a Charge-Coupled-Device (CCD).

The signaling interface comprises protocols for sending and receiving signals, which carry information to and from sensors, operation modules and communication system. These signals are mainly sent on a local network which also comprises a wireless network. Thus the signal comprises a plurality of parts such as address, identity and messages.

The mechanical interface comprises a mechanical coupling to dock with the different operational modules. In a first embodiment, the mechanical interface comprises a gripping means on which the operation module is coupled. In an another embodiment the mechanical interface comprises a hitch frame, which in one embodiment is rotatable around a axis normal to the longitudinal axis of the robot. In yet another embodiment, the hitch frame comprises a lowerable and raisable bar with one or a plurality of hooks.

The communication means comprises in a first embodiment a transmitter and a receiver for wireless communication. The communication medium is preferably electromagnetic waves but may also comprise sonic or a light communication medium.

The robot must be easily operated, without the need for complicated reprogramming. In a preferred embodiment, the robot is responding to spoken commands or commands sent via efficient communication means from a human or another computer or processor unit. In another preferred embodiment, the have extensive on-board computing capacity to be able to work autonomously, making their own decisions without requiring continual instructions and monitoring from an operator.

In a preferred embodiment, the operation module is provided with its own wheels. In this way they are storable and movable independently of the autonomous mobile robot and support their own loads. In another preferred embodiment, they are also be provided with their own power means, for lifting etc. They also have means for electrical connection as well as means for signaling and interaction with the autonomous mobile robot. In this way, a docked operation module is capable of powering the autonomous robot.

An autonomous mobile robot normally has at least three wheels to be able to stand stable in an upright position. When such a robot is docked with an operation module, which has two wheels, to form an operation unit this unit often comprises five wheels or more. The unit then becomes unstable and thus two wheels have to be canceled. If there is arranged the functionality of a horizontal axis between two pairs of wheels only one wheel has to be canceled. According to the invention this solution is very convenient since the invented robot only has two wheels. In one embodiment of the invention, the wheels of the robot forms one pair of wheels and the two wheels of the operation module forms another pair of wheels. Then by having a coupling device between the two that comprises free rotation around a horizontal axis, all four wheels are in firm contact with the ground thus the operating unit becomes stable.

In another embodiment of the invention the robot has a coupling hatch by which the front end of an operational module is lifted such that only two wheels are in firm contact with the ground. In another preferred embodiment, all but one or at least all but two wheels of the operation module are freely swivelable in all directions around an axis normal to the horizontal plane. In another preferred embodiment of a combined unit, one or two wheels of the operating module are in firm contact with the ground and thus act as tracking wheels.

It is difficult to construct mathematical models for steering an autonomous mobile robot, which is coupled to a wheeled operation module, if the mathematical model must take into consideration the present orientation of the autonomous mobile robot in addition to the orientation of the wheeled operation module. This problem is dealt with by the axle construction. By making the coupling hitch frame pivotable relative to the driven wheel axle, the number and the complexity of the sensors on the autonomous mobile robot is decreased. The term "wheeled" in the claims is also intended to encompass wheeled robots having crawler or caterpillar tracks around the wheels.

An advantageous hitching means between the autonomous mobile robot and the selected operation module is defined whereby the coupling and decoupling is effected automatically without requiring that the center lines of the autonomous mobile robot and the operation module be in exact alignment before coupling.

The problem of automatically determining the length and orientation relative to the autonomous mobile robot of the operation module, and the presence or absence of obstacles beside the operation module is solved by the sensor constructions.

The present invention also encompasses a method of robotic performance of a plurality of tasks by means of the inventive mobile robot system incorporating at least one inventive autonomous mobile robot, whereby the robot receives a task command via the wireless communication interface and selects, approaches and couples itself with an appropriate operation module, performs a task and then decouples itself from said module. This is suitably performed using a computer program product, presented by any suitable medium, according to the invention for complete or partial processor-execution of the method.

The invention also include a computer program product containing a software program that comprises instructions for a computer or a processor to drive the two-wheeled robot or perform the step of the method described above.

BRIEF DESCRIPTION OF THE DRAWINGS

The advantages of the present invention will become more apparent when read with the specification and drawings, of which.

DETAILED DESCRIPTION OF EMBODIMENTS

Figure 1:
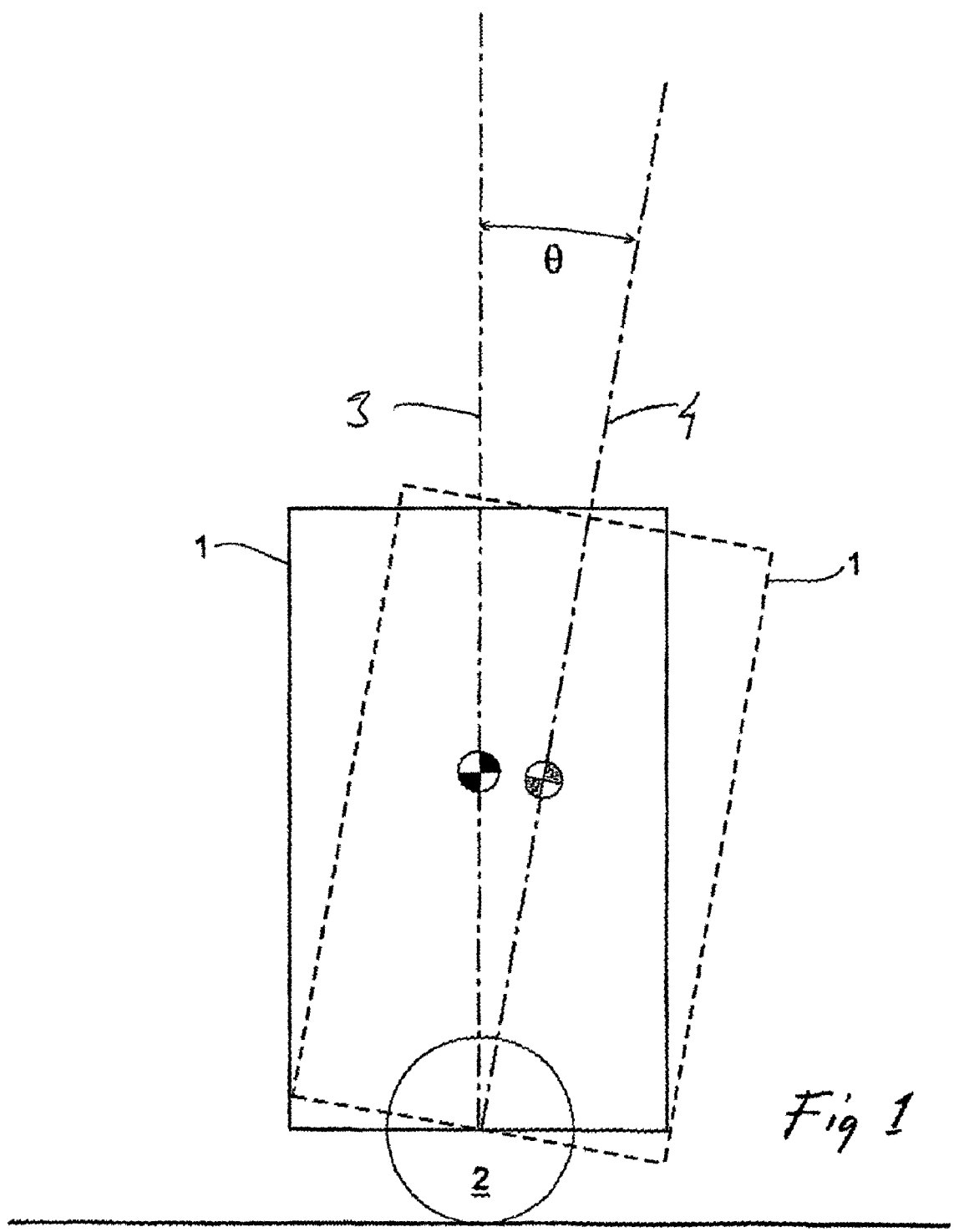
FIG. 1 schematically shows the principle used for driving and keeping the mobile robot balanced on its two wheels when operating alone.

FIG. 1 purely schematically shows a two-wheeled robot according to the invention. The robot 1 has a body 1 preferably containing a processing unit for autonomous movement. This processing unit is included a system for oscillation damping/balance, steering and driving. In this preferred embodiment the processing unit also governs systems for orientation and navigation, as well as receiving signals from an onboard sensor/guidance system. This preferred autonomous mobile robot or autonomous mobile robot also has an on-board wireless communication interface for receiving and sending signals, which may be of short-range FM or so-called "Bluetooth" type.

The autonomous mobile robot runs on a single pair of coaxial driven wheels 2. These wheels are differentially driven, either by two separate electric motors or by variable differential gearing from a single motor, thereby providing steering, even being turnable about the robots own central vertical axis by driving the wheels in opposite directions.

The autonomous mobile robot is kept in balance on its two wheels by employing a drive control using selected input parameters such as the tipping angle θ, the derivative of the tipping angle θ, the robot position and the drive torque to keep the center of gravity substantially above the line of contact of the wheels with the floor. The tripping angle is the angular difference between the vertical line 3 through the wheel axle and the longitudinal line 4 from the wheel axle through the center of gravity. The robot having its center of gravity lying above the wheel axle is mathematically regarded as an "inverted pendulum" hinged on an electric motor driven cart. According to the "inverted pendulum" model, which is a known mathematical model in control engineering and which will not be discussed in more detail here, the inverted pendulum is to be kept upright via an output current delivered to the electric motor.

When standing still the robot will move slightly back and forth to maintain balance. Before accelerating forward, the robot will move slightly backward to make the robot tilt slightly forward before the robot accelerates forward, so that the torque produced by gravity counteracts and cancels the torque generated by the wheel-motor accelerating forward. When moving forward at constant speed, very small retardation and accelerations superimposed on the constant speed driving of the wheels will keep the robot in upright balance. Before halting or slowing down from a constant speed, the robot will similarly be programmed to accelerate slightly to tip it backward and utilize the torque produced by gravity to counteract and cancel the forward-tipping torque generated by the deceleration.

In a practical embodiment, the robot may suitably be provided with two heels (not shown) spaced on either side of the wheel co-axis. In normal operation, both of these heels are spaced off the ground. In the event of a control failure or power failure the robot will not tip over but come to tilted rest on one of the heels. In a further embodiment of the invention, the robot has a function in the processing unit whereby the robot, when standing alone, is inactive for a certain period of time it will enter a standby mode with its oscillation damping, steering and drive system temporarily deactivated and resting tilted onto one of its heels.

Should the robot come to rest against a wall or should a person or object enter the path of the robot, the robot may be in a position in which it is physically impossible for it to carry out its balancing adjustments of position, since it cannot move closer to the wall or intervening object. Or a sensor may send a signal to the processing unit triggering a prohibition for the robot to move closer to the intervening object. In such cases an override algorithm will kick in commanding the robot to move away, even if it is not in upright balance, possibly skidding on one of the heels, until it is able to assume upright position away from the wall or object.

Figure 2:
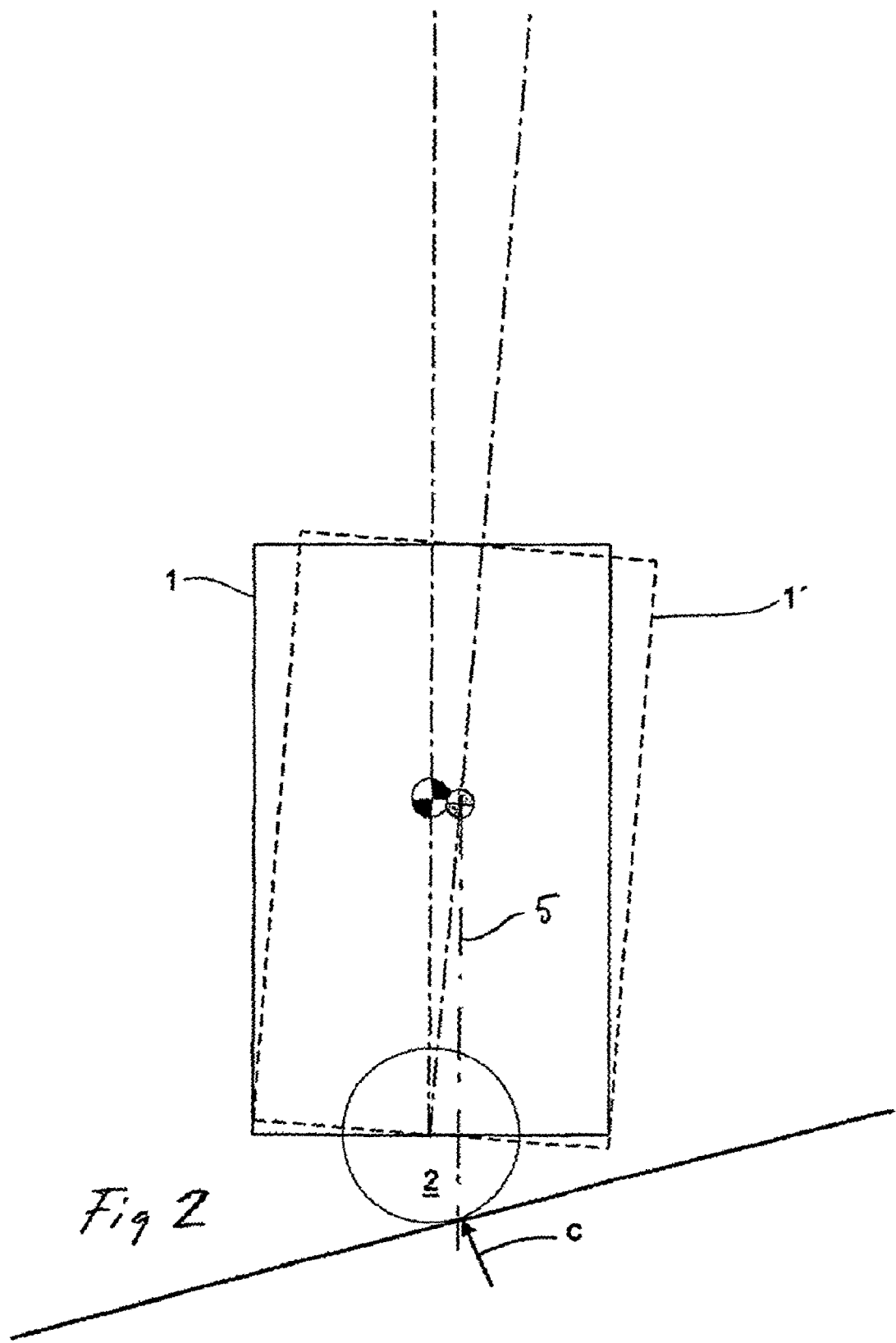
FIG. 2 schematically shows the mobile robot when driving up an incline.

FIG. 2 schematically shows a view of a represented two-wheeled robot climbing a steep incline. The oscillation balance system tips the robot forward to keep the center of gravity placed substantially vertically over the line 5 of contact point c between the wheels and the surface, thereby keeping the robot in upright balance.

In a further embodiment of the invention the autonomous mobile robot has its center of gravity located below the co-axis of the pair of wheels, thereby achieving a natural stability. The pendulum oscillation damping, steering and drive means permits the autonomous mobile robot, which may weigh up one hundred kilograms to have natural stability due to a low center of gravity and at the same time be accelerated and decelerated without excessive oscillation, which could otherwise disturb the sensor/guidance system and the navigation and orientation systems.

When the center of gravity of the robot is located below the co-axis of the wheels the mathematical control model used is that of a regular pendulum (a.k.a. the "crane") model which is employed to prevent excessive rocking of the robot with low center of gravity when it accelerates or decelerates.

Having the center of gravity above the co-axis may however provide the advantages of a high position of the sensors and coupling hitch and enabling the robot to pass over certain objects and projections.

It will be understood that if the center of gravity is directly on the wheel co-axis, there will be no natural balance as with a center of gravity below the co-axis and no possible gravity induced tipping torque to indicate tipping angle and counteract acceleration and deceleration as when there is a center of gravity above the co-axis.

Figure 3:
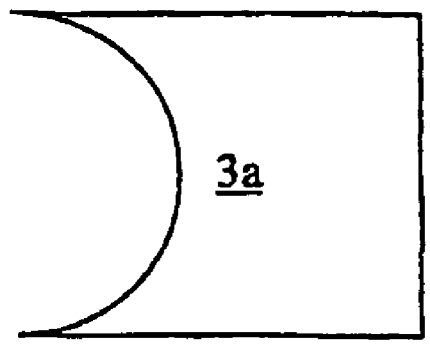
FIG. 3 illustrates in chart form the principle of the robot system according to the invention.
Figure 3:
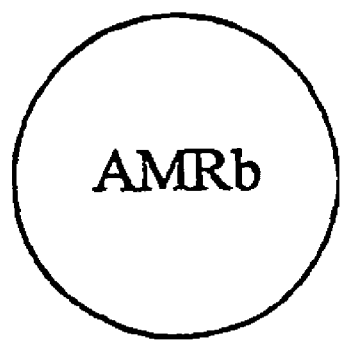
Figure 3:
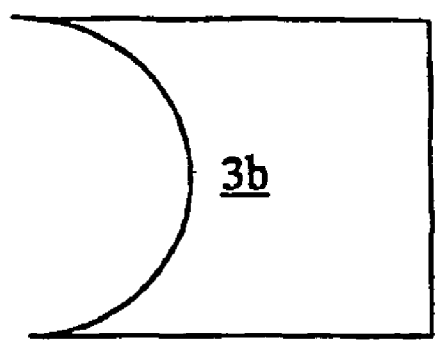
Figure 3:
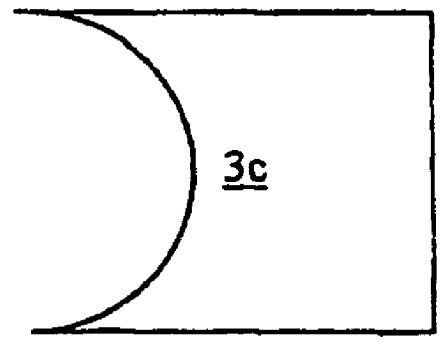

This universal autonomous mobile robot is provided with sophisticated navigation, steering and orientation systems, possibly comprising on-board digitized maps, compasses, various landmark recognition systems, gyros and/or GPS. The problems of design work, logistics and costs are solved by having a universal central autonomous mobile robot, which automatically couples itself to one of a plurality of implement modules, as shown in chart form in FIG. 3. For ease of storage, manual movement, ease of coupling and even weight distribution on the autonomous mobile robot/module unit, these implement modules are preferably born on their own wheels. Just a very few examples of different implement modules usable in a hotel environment are: a meal-tray storage and distribution module, a transport module, a clean laundry loading and distribution module, a dirty laundry receiving, transport and unloading module, a vacuum cleaning module, a floor polishing module, modules for the retrieval and delivery of all manner of supplies, and modules for the reception and disposal of all manner of used supplies and waste. The robot and system according to the present invention used for many different tasks will more frequently have a task which it can perform with one of its implement modules and can thus be used around the clock, thereby increasing still further the cost-benefit of the robot system.

These above-mentioned examples are just a very few of the many ways the system according to the invention is readily adaptable to new tasks by providing a new module but still using the same autonomous mobile robot, in which there are concentrated the functions of traction, navigation, steering, transceiving, safety sensing etc., functions which are difficult, time consuming and expensive to design into a robot. The robot system according to the invention becomes economically feasible in environments of smaller size than the size required to make a task-dedicated robot, which usually requires a very large hotel unit for economic feasibility. The robot system according to the invention provides the capability of performing many more tasks than was previously possible. Its universal nature provides the capability of using a number of identical robots in the same system.

Figure 4:
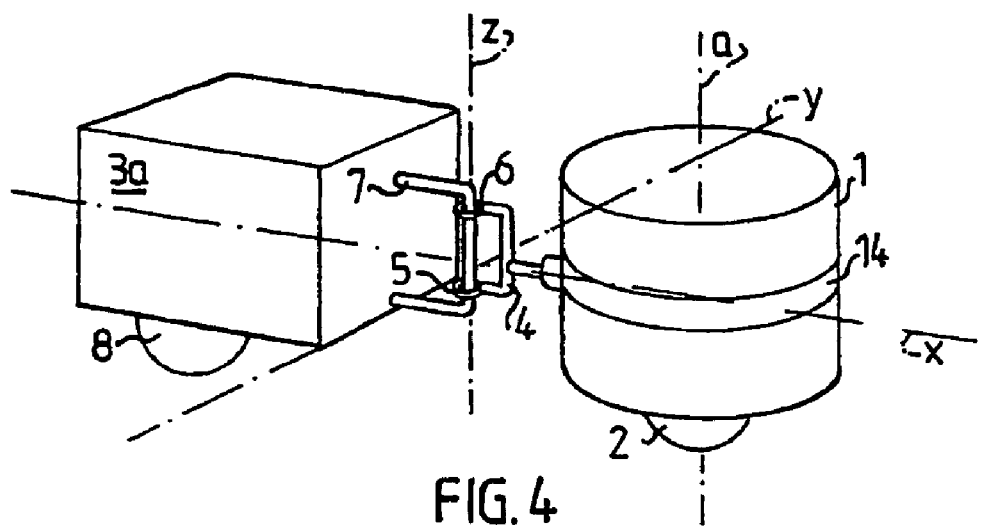
FIGS. 4–6 show schematically the principles used for coupling the robot to three different types of wheeled operation modules using a single coupling hitch.
Figure 5:
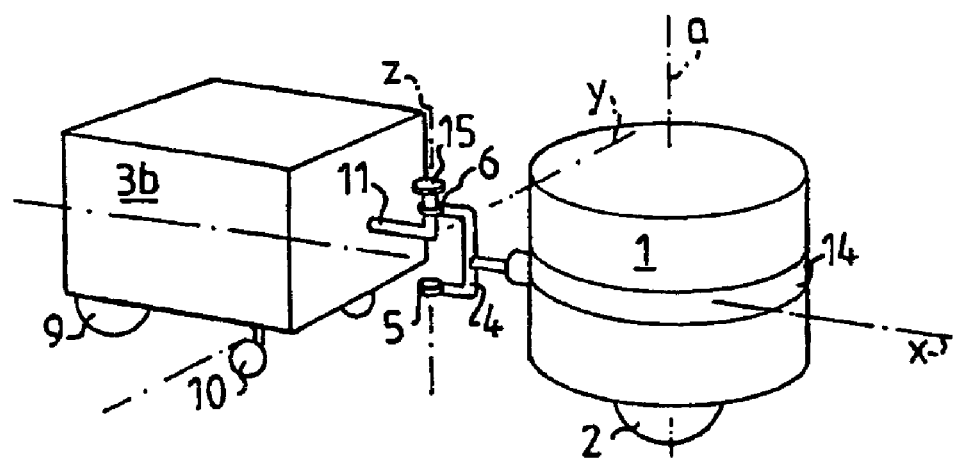
Figure 6:
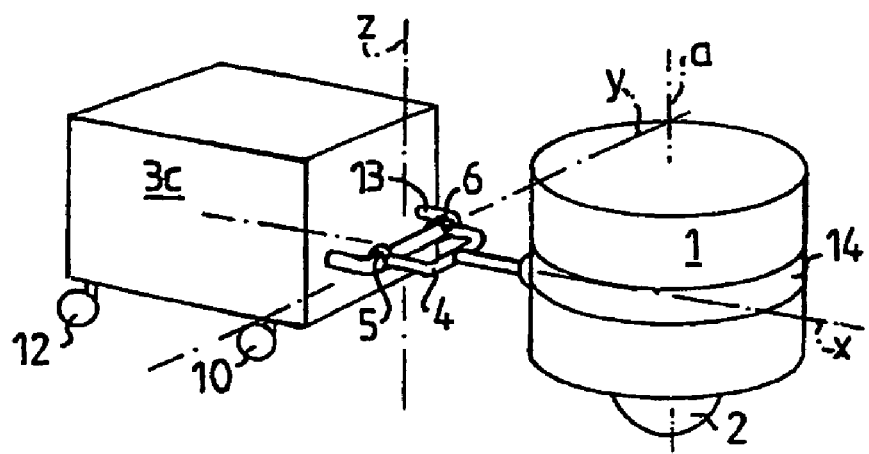

FIGS. 4–6 show schematically, and with a very exaggerated coupling for the sake of illustration, the autonomous mobile robot coupled to three different basic types of wheeled implement modules. According to the mobile robot system of the invention, the two-wheeled autonomous mobile robot moves alone using its pendulum oscillation/ balance, steering and drive system and automatically couples itself to a wheeled implement module 3 which it selects to perform a specific service or transport task. When coupled to the wheeled implement module 3, the pendulum oscillation damping/balance function is deactivated leaving a simpler drive system activated. The autonomous mobile robot no longer needs to balance on two wheels or damp pendulum oscillations since it will be supported by being coupled to the selected wheeled implement module.

The same autonomous mobile robot is used in the three different examples in FIGS. 4, 5 and 6. It has a coupling hitch 4, which in this case is only schematically represented for the sake of illustration. The coupling hitch is rotatable about its longitudinal axis x and has two spaced mechanical gripping means rotatable in fixed spaced relationship in a plane normal to a longitudinal axis passing through the robot.

It will be understood that the figures merely represent the principles of the coupling hitch used on a two-wheeled robot, which may be realized in many other forms, for example gripping directly into a module instead of onto a bar, or using other hooking and connection means than closeable and openable clamps.

In this particular embodiment, the coupling hitch 4 is part of a coupling hitch frame 14, which is rotatable relative to the body of the autonomous mobile robot 1. However, in some situations, for example to assure unambiguous tracking or for backing up a coupled robot, it may be advantageous to lock the frame relative to the body.

Using its pair of differentially drivable wheels 2, the autonomous mobile robot 1 can rotate itself if so desired to any desired direction without changing the positions of the hitch frame 14, its coupling hitch 4 or the wheeled implement module 3a, 3b or 3c.

Attention is now directed specifically to the type case illustrated in FIG. 4, showing the universal autonomous mobile robot 1 coupled to a specific type of wheeled implement module 3a, namely one having a single pair of coaxial wheels 8, which in this case are non-swiveling. The implement module 3a has a vertical hitching bar 7. Before coupling, the rotatable coupling hitch rotates to a vertical position as shown in the figure and its two openable and closable coupling clamps 5 and 6 both close about the vertical hitching bar 7 but preserving pivotability about the vertical axis z. The two vertically spaced clamps 5 and 6 and the bar 7 prevent the coupled autonomous mobile robot and implement module from pivoting about the transverse axis y passing through the coupling, thereby keeping both the autonomous mobile robot and the implement module from tipping. It is also possible to make the clamps grip tightly about the bar when necessary to obtain unambiguous tracking. The coupling may allow a certain amount of rotation about the longitudinal axis x.

This arrangement shown in FIG. 4 allows the autonomous mobile robot 1 to steer itself in any direction largely without regard to the existing orientation of the autonomous mobile robot 1 and the implement module. In other words the steering is holonomic ("whole-ruling"), requiring much simpler control considerations and commands than if the current orientation of the autonomous mobile robot and the implement module had to always be considered when calculating the motion in a desired direction. At the same time the implement module tracks unambiguously.

FIG. 5 shows another type of implement module 3b having a rear pair of non-swiveling wheels 9 and a front pair of freely swivelable wheels 10. An L-shaped bar 11 having an upright post with a knob 15 at the end is rigidly mounted in the implement module 3b. The coupling hitch 4 is placed in its vertical position as in FIG. 4, but in this case only the upper clamp 6 clasps around the upright post below the knob 15. What is important in this case is that the clamp 6, and with it the coupling hitch 4, is kept at the same height with respect to the implement module 3b. This will prevent the autonomous mobile robot 1 from tipping, the implement module 3b having four wheels to prevent it from tipping. This configuration will also allow the autonomous mobile robot to steer itself in any direction without regard to the existing orientation of the autonomous mobile robot and the implement module, which has freely swivelable front wheels 10. And at the same time the arrangement will track unambiguously. In this particular embodiment shown, a certain amount of rotation is possible about the x and y axes. It may also be suitable to allow the clamp 6 to clamp tightly around the L-shaped bar 11 in certain tracking and steering situations.

The third type of implement module 3c is illustrated schematically in FIG. 6. This third type, which could be a laundry transport module for example, has two pairs of swivelable wheels 10 and 12. For coupling the autonomous mobile robot 1 turns its coupling hitch 4 to a horizontal position to clasp both clamps or grips 5 and 6 in spaced horizontal relation to a horizontal bar 13 fixed to the implement module 3c. In this case the coupling has pivotability about the transverse axis y. Since there are two pairs of swivelable wheels 10 and 12, the fixed horizontal spacing of the clamps 5 and 6 is necessary to achieve unambiguous tracking. Some rotatability about the x axis may be necessary.

In each of the three cases shown above, three necessary functions are achieved with the very same coupling hitch 4:
1. Keeping the autonomous mobile robot from tipping over when the oscillation damping/balance function is deactivated,
2. Permitting easy steering of the combined unit (without regard to starting orientation),
3. Providing unambiguous tracking without locking swivel wheels or lowering a tracking wheel.

It will be understood that in practice the coupling hitch and the complementary hitch component on each implement module will in most cases be more compact and have a more practical design, but preserving the pivot functions outlined here.

The invention claimed is:

1. An autonomous wheeled mobile robot, comprising:
at least one wheel-driving motor;
an on-board computer;
means for autonomous navigation, orientation, and maneuvering in an environment with moving obstacles;
a sensor system;
a wireless communication system for receiving and sending;
supporting means composed of a single pair of coaxial driven wheels only;
a pendulum dependant oscillation balancing system; and
a steering and drive system that superimposes the balancing system.

2. The mobile robot according to claim 1, wherein the center of gravity of said robot lies above a co-axis of said single pair of coaxial wheels.

3. The mobile robot according to claim 2, wherein said robot is provided, at a distance from said co-axis, with at least one downwardly depending fixed support, disposed to normally remain out of contact with an underlying surface when the robot is in upright balance, but come into contact with the underlying surface should the robot lose balance, thereby preventing the robot from tipping over.

4. The mobile robot according to claim 1, wherein the center of gravity of said robot lies below the co-axis of said single pair of coaxial wheels and that the pendulum dependent oscillation balancing system is disposed to attenuate excessive oscillation.

5. The mobile robot according to claim 1, wherein the pendulum dependent oscillation balancing system is disposed to maintain the center of gravity of the robot substantially vertically above the line of contact between said single pair of drive wheels and an underling surface even when that surface is not level.

6. The mobile robot according to claim 1, further comprising:
   a coupling hitch frame for autonomous selective mechanical and/or electrical coupling to, and uncoupling from, one of a plurality of different interchangeable wheeled implement modules.

7. The mobile robot according to claim 6, wherein said coupling hitch frame comprises a mechanical gripping means which can establish a coupling to an implement module having a single pair of wheels, which permits free pivoting between the robot and the implement module about a vertical axis passing through the robot-implement coupling but no pivoting between the robot and the implement module about a transverse axis passing through the robot-implement coupling.

8. The mobile robot according claim 6, wherein said coupling hitch frame comprises a mechanical gripping means which can establish a coupling to an implement module having one front pair of free running swivelable wheels and one rear pair of free running non-swievelable wheels, which permits free pivoting between the robot and the implement module about a vertical axis passing through the robot-implement coupling maintaining a substantially fixed height between said swievlable wheels and said coupling.

9. The mobile robot according claim 6, wherein said coupling hitch comprises a mechanical gripping means which can establish a coupling to an implement module having two pairs of free-running swivelable wheels, which permits no pivoting about a vertical axis passing through the robot-implement coupling.

10. The mobile robot according claim 6, wherein said coupling hitch comprises two spaced mechanical gripping means rotatable in fixed spaced relationship in a plane normal to a longitudinal axis passing through the robot.

11. The mobile robot according claim 6, wherein the coupling hitch frame is pivoted about a vertical axis passing through the midpoint between said single pair of drive wheels.

12. The use of a mobile robot according to claim 1 for transport in a peopled environment.

13. A mobile robot system for performing a plurality of separate operations, comprising:
    at least one autonomous wheeled mobile robot having at least one wheel-driving motor;
    an on-board computer;
    means for autonomous navigation, orientation, and maneuvering in an environment with moving obstacles;
    a sensor system;
    a wireless communication system for receiving and sending signals;
    supporting means composed of a single pair of coaxial driven wheels only;
    a pendulum dependent oscillation balancing system;
    a steering and drive system that superimposes the balancing system; and
    a plurality of dockable operation modules, which are selectively couplable with the autonomous mobile robot to form an operation unit.

14. The robot system according to claim 13, wherein said balancing system is automatically deactivated when said robot is coupled to a wheeled implement module whereupon the steering and drive system controls transport of the operation unit.

15. The robot system according to claim 14, wherein said balancing system is automatically activated when said robot is decoupled from a wheeled implement module.

16. The robot system according to claim 13, wherein the autonomous mobile robot is provided with at least a pair of rearwardly directed sensors, laterally mounted on either side of the autonomous mobile robot or its coupling hitch frame, whereby a orientation, length and position of an implement module and surrounding obstacles are sensed and processed by the on-board computer.

17. The robot system according to claim 16, wherein said rearwardly directed sensors are laterally telescopically mounted to be extended beyond a width of a implement module which is coupled to the autonomous mobile robot.

18. A method of robotic performance including a plurality of separate operations by means of a mobile robot system comprising at least one autonomous wheeled mobile robot having at least one wheel-driving motor; an on-board computer; means for autonomous navigation, orientation, and maneuvering in an environment with moving obstacles; a sensor system; and a wireless communication system for receiving and sending signals, the method comprising:
    an operation module in a module store is chosen for a predetermined operation,
    the robot autonomously docks with the operation module and forms an operation unit,
    the operation unit autonomously transports itself to an ordered location by intelligence of the robot,
    the operation is autonomously carried out by the operation module at the location, and
    the operation unit autonomously returns to the module store where the robot and the operating module are undocked.

19. A computer program product including a software program comprising instructions for a computer to perform a method according to claim 18.

20. The computer program product according to claim 19, supplied at least in part over a network such as the Internet.

21. A computer readable medium containing a computer program product according to claim 19.

22. The method according to claim 18, further comprising:
    balancing the robot with a pendulum dependent oscillation balancing system undocked from the operation module.

23. The method according to claim 22, further comprising:
    disengaging the pendulum dependent oscillation balancing system after the robot autonomously docks with the operation module.

24. The method according to claim 18, further comprising:
    automatically activating a balancing system when the robot is undocked from the operating module; and
    automatically deactivating a balancing system when the robot is docked to the operating module.

* * * * *